May 2, 1933.  L. D. SOUBIER  1,906,649
GLASSWARE FORMING MACHINE
Filed Aug. 22, 1930  2 Sheets-Sheet 1
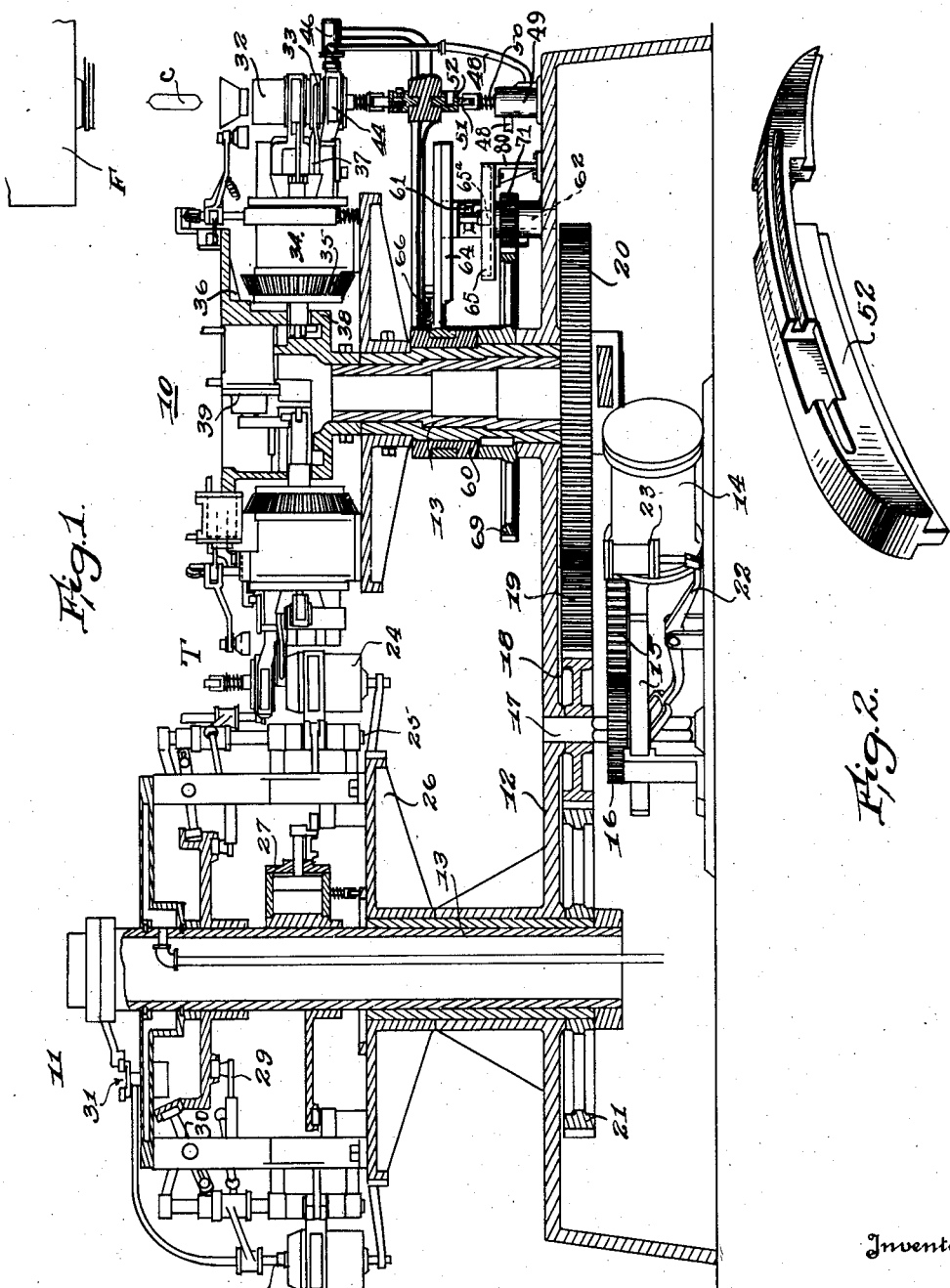
Inventor
Leonard D. Soubier
By
J. F. Rule, Attorney May 2, 1933.  L. D. SOUBIER  1,906,649
GLASSWARE FORMING MACHINE
Filed Aug. 22, 1930    2 Sheets-Sheet 2
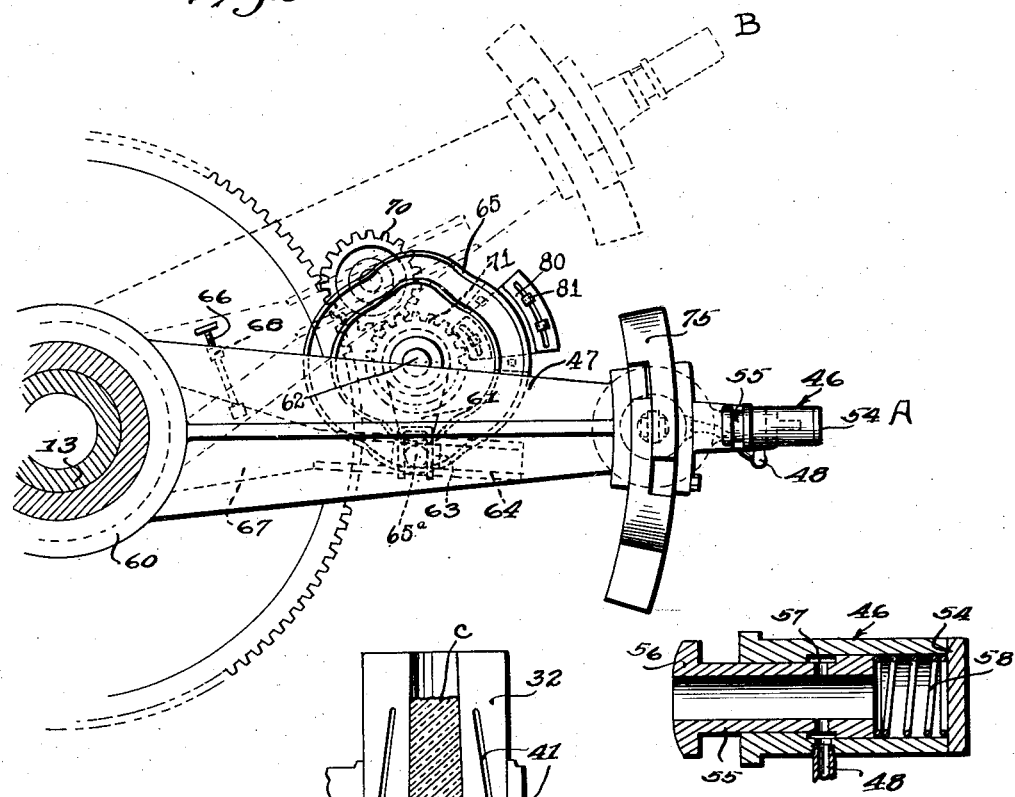
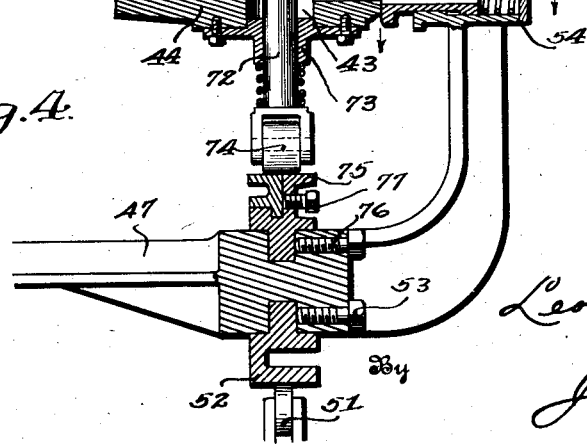

Patented May 2, 1933

1,906,649

UNITED STATES PATENT OFFICE

LEONARD D. SOUBIER, OF TOLEDO, OHIO, ASSIGNOR TO OWENS-ILLINOIS GLASS COMPANY, A CORPORATION OF OHIO

GLASSWARE FORMING MACHINE

Application filed August 22, 1930. Serial No. 477,067.

The present invention relates to improvements in glassware forming machines and more particularly to that type in which articles of glassware are partially formed in molds on one table and later transferred to molds on another table for completion. In machines of the above character, especially "Lynch" type machines, blank and finishing mold tables are arranged side by side and rotated about their individual axes so that blank molds with their charge receiving ends opening upwardly, are brought in succession to a charging position beneath the bottom outlet opening of a boot or forehearth containing a supply body of molten glass.

Intimate contact between the mold charges of molten glass, the neck molds, and plunger for different lengths of time, is necessary in order to properly chill and set the glass in the neck and finish portions and thereby insure against distortion of those portions of the partially formed articles of glassware prior to and during transfer of the articles from the blank molds to the finishing molds.

An object of the present invention is the provision of novel means for applying vacuum to the neck molds during the mold charging operation and for a predetermined variable period of time following said operation while the blank molds are moving from the charging station to the next succeeding station to thereby hold the glass in snug contact with the metal mold and plunger. To this end there is provided means operatively engaging the neck molds at the mold charging station and traveling with each mold a predetermined distance for applying vacuum thereto, and then returning to the charging station for engagement with the next succeeding mold.

Another object is the provision of adjustable means for controlling the point at which the plunger which projects into the neck mold may be withdrawn from the latter. The provision of means functioning as just stated is adapted to retain the plunger in contact with the glass for different periods of time which are determined by the quantity of glass in the neck and finish of the articles of glassware. In this connection it may be stated that a heavy finish or/and neck portion requires a comparatively long period of contact between the glass and plunger in order that the metal may extract sufficient heat from the glass to prevent distortion and collapse of the neck or finish portions after they are unsupported by the plunger and neck mold.

Other objects will be in part apparent and in part pointed out hereinafter.

In the drawings:

Fig. 1 is a sectional elevation of a two table machine embodying my invention.

Fig. 2 is a detail perspective view showing the type of adjustable cam employed for controlling application of vacuum to the neck molds, and the positions of the plungers.

Fig. 3 is a plan view showing the oscillating arm included in the means for applying vacuum to the neck molds and in addition, the two extreme positions of said arm.

Fig. 4 is a sectional elevation showing in detail the separable connection between the vacuum applying means and neck molds and the location of the cam for controlling the positions of the plungers.

Fig. 5 is a sectional view taken along the line V—V of Fig. 4.

The machine in which my invention is embodied in the present application comprises, generally, a blank mold table 10 and finishing mold table 11, arranged side by side upon a base 12 and adapted to rotate about the axes of stationary vertical columns 13 which are suitably secured to the base 12. Rotation of the mold carriages may be continuous or intermittent, the present embodiment providing for intermittent movement so that the molds are stationary during the mold charging and blank transfer operations. Mechanism for imparting such movement to the tables includes an air motor 14 (Fig. 1) operating through a pair of rack bars 15 to periodically rotate a gear 16 which is mounted on a vertical shaft 17 carrying a gear 18. The last named gear 18 runs in mesh with a gear 19 operatively connected to a gear 20 at the lower end of the blank mold table 10, and also runs in mesh with a gear 21 at the lower end of the finishing mold table 11. The first named gear 16 is mounted for limited vertical movement on the shaft 17 so that it operatively engages the rack bars 15 one at a time, with the result that movement of the bars in one direction actuates the gear 16 to impart a predetermined degree of rotation to the latter and movement of the rack bars in the other direction causes movement of said gear in the same direction and to the same degree as before. A pivoted control lever 22 alternately raises and lowers the gear 16 for engagement with the rack bars one at a time and is actuated at regular time intervals by a piston motor 23 whose operations are timed with those of the piston motor 14 by suitable timing mechanism (not shown).

Articles of glassware are partially formed in molds on the blank mold table 10 and at the transfer station "T", between the adjacent sides of the blank and finishing mold tables, are transferred to finishing molds 24 for completion. These finishing molds 24 are pivoted to vertical hinge pins 25 mounted on a rotary frame 26. Mechanism including a piston motor 27 operates at regular time intervals to close the finishing molds about partially formed articles at the transfer station "T". Means for introducing air under pressure into the finishing mold may include a blowing head 28 which is adapted to be swung laterally into position over the finishing mold by cam controlled mechanism 29 and then moved downwardly into contact with the upper end of the finishing mold by cam controlled mechanism 30. Application of blowing air is controlled by a cam actuated valve mechanism 31. The specific form of mechanism involved in the finishing mold table does not constitute a part of the present invention and accordingly is only briefly described.

The blank mold table 10 may also be of conventional form comprising an annular series of mold groups, each including partible blank and neck molds 32 and 33 respectively, mounted on rotary carriers 34 whose axes extend radially of the mold table. The carriers 34 are adapted to be oscillated at regular time intervals to alternately invert and reinvert the blank and neck molds 32 and 33, said molds while beneath the molten glass feeder "F", opening upwardly in position to receive mold charges, and at the transfer station "T" occupying an upright position preparatory to the transfer of the partially finished articles from the blank molds to the finishing molds. Such oscillation of the carriers is obtained through mechanism including bevel ring gears 35 which mesh with rack bars 36 at regular time intervals.

The blank and neck molds may be opened and closed by suitable mechanism 37, said mechanism being actuated by a cam 38 to hold both molds closed while beneath the feeder "F" and until shortly in advance of the transfer station "T", where the mechanism becomes operatively engaged with a piston motor 39 which by suitable means (not shown) is operated to open the blank molds and then the neck molds.

After a mold charge "C" of molten glass has been deposited in the blank and neck molds, vacuum is applied to the mold cavities, particularly the neck mold cavity for the purpose of effecting exceptionally intimate contact between the glass, neck molds 33, and plunger 40. For this purpose the blank and neck molds (Fig. 4) are provided with vacuum grooves 41, which, while the neck mold is closed communicate through the conduit 42 with a vacuum chamber 43 which is formed in a circular head 44 positioned beneath the neck mold 33. Each of these heads, which correspond in number to that of the blank molds, is provided with a vacuum port 45 extending radially thereof and opening through its outer end, said port adapted for connection with a source of vacuum supply (not shown) by way of a conduit 48 and main and auxiliary vacuum control valves 49 and 46 respectively. The main valve 49 is mounted on the base 12 substantially at the charging station. The valve stem 50 carries a cam roll 51 adapted to be engaged periodically by an extensible cam 52, the latter suitably mounted on an arm 47. The cam 52 (Figs. 2 and 4) comprises two sections connected together so that they may be adjusted lengthwise relative to one another to thereby change the effective length of the cam. Locking screws 53 provide connection between the cam 52 and arm 47. The auxiliary valve 46 (Figs. 4 and 5) is mounted on the upturned end of the arm 47 and comprises a housing 54 fixed to the said end, and a sleeve valve 55 slidingly arranged in said housing. The outer end of the sleeve valve 55 is provided with a head 56 adapted to have sealing engagement with the head 44 at regular time intervals to thereby provide communication between the vacuum chamber 43 and the interior of the sleeve valve. This sleeve valve is formed with a series of radial ports 57 which at times provide communication between the interior of the sleeve valve and the vacuum pipe 48 which is suitably connected to the valve housing 54. A coil spring 58 (Fig. 5) normally yieldingly holds the sleeve valve in position to shut off communication between the interior of the valve and the pipe 48.

Immediately after a mold charge is dropped into a pair of blank and neck molds, the auxiliary valve 46 is brought into contact with the corresponding head 44 so that communication is established between the vacuum chamber 43 in the head and the valve housing 54, and thence through one section of the conduit 48 to the main control valve 49. Contact between the head 44 and valve 46 moves the sleeve valve 55 axially causing communication between the interior of the sleeve valve and one section of the conduit 48. The main control valve 49 is then opened and vacuum is applied through the conduit and auxiliary valve to the blank and neck molds. Such application of vacuum is maintained while the molds move through any predetermined angle. When applying vacuum to the blank and neck molds as just described the arm 47 is oscillated so that it travels with the molds a predetermined distance and then automatically returns to the mold charging position where it engages the next succeeding pair of blank and neck molds. This is accomplished by a construction including a collar 60 oscillatively mounted on the stationary central column 13 of the blank mold table 10, said collar in part supporting the arm 47 which carries the auxiliary valve 46 and cam 52, the latter periodically actuating the main control valve.

Oscillation of the arm 47 (Figs. 1 and 3) at regular time intervals is effected by mechanism including a crank arm 61 secured to the upper end of a rotary shaft 62 rising from the base 12. This crank arm has a forked outer end providing sliding connection between the arm and a slide block 63 which rides in a slideway 64 formed on an arm 67, the latter being oscillatively mounted on the central column 13 of the blank mold table. By rotating the crank arm 61, oscillatory movement is imparted to the arms 47 and 67. The path of travel of the slide block 63 is determined by a continuous cam 65 which is shaped to so guide a cam roll 65ª carried by the slide block, that register of the heads 44 and auxiliary valve 46 may be maintained during movement of the arm 47 in one direction. Any slight relative movement of the heads 44 and valve 46 is compensated for by the relative diameters of the aligned ports in said heads and auxiliary valve which permit a certain degree of relative movement without breaking the vacuum connection between the heads and valve. Also, the cam 65 may be adjusted about the axis of the shaft 62 if operating conditions require such adjustment. For this purpose a bracket 80 is secured to the lower side of the cam and has bolt and slot connection to the base 12. By loosening the bolts 81 the cam and bracket may be moved about the axis of the shaft 62.

The arms 47 and 67 are relatively adjustable about the axis of the blank mold table to compensate for any inaccurate setting of the arm 47 so that accurate registration of the ports in the heads 44 and the opening in the auxiliary control valve 46 may be effected. For this purpose an adjusting screw 66 is pivoted at one end to the arm 67 and is threaded through a guide block 68 on the lower side of the other arm 47. By rotating the screw 66 the arms 47 and 67 are moved circumferentially with respect to each other so that the desired setting of the auxiliary valve 46 on the arm 47 may be obtained. Rotation of the shaft 62 on which the crank 61 is mounted is obtained by means including a gear 69 on the column 13 of the blank mold table, said gear operating through an idler 70 to rotate a spur gear 71 suitably connected to the shaft 62.

The points at which the plunger 40 is moved into and out of the neck mold are variable in order that contact between the plunger and molten glass may be maintained for any desired period of time, depending upon the amount of heat to be extracted from the glass. The plungers are individual to the blank molds and carried by holders 72 mounted in suitable guides 73. These holders may carry cam rolls 74 which at regular time intervals are brought into engagement with an adjustable cam 75 secured to the upper side of the arm 47 by set screws 76. This cam 75 may be of the same construction as the vacuum control cam 52, such construction including two sections adapted to be held in any desired relation by a set screw 77.

In operation, the mold tables 10 and 11 are intermittently rotated in such a fashion that the blank and neck molds are held stationary at the charging station "A" while a mold charge "C" is severed from a supply body in the feeder "F" and delivered by gravity into the mold. At this position the main control valve 49 is opened by the cam 52 so that the vacuum is applied to the conduits 48 up to the auxiliary control valve 46. Immediately upon reaching the charging station "A" the head 44 is aligned with the auxiliary valve 46 causing the latter to open so that vacuum is immediately applied to the blank and neck mold cavities. This application of vacuum is maintained by moving the arm 47 in synchronism with the movement of the blank and neck molds and until just prior to the return movement of the arm 47 and auxiliary valve 46 from the station "B" to the charging station "A". As stated heretofore, the length and location of the cam 52, which may be varied, determine the period of time during which the vacuum control valve 49 is open, and the points of application and shutting off of vacuum. Projection and withdrawal of the plunger 40 are controlled by the cam 75 which oscillates with the arm 47. The cams 52 and 75 may be suitably positioned with respect to one another to provide any desired time interval between shutting off the vacuum to the molds and withdrawing the plunger. Both operations may be effected simultaneously or otherwise as may be necessary.

Modifications may be resorted to within the spirit and scope of the appended claims.

What I claim is:

1. In a glassware forming machine, the combination of an annular series of blank and neck molds rotatable about a vertical axis past a mold charging station and a blank transfer station, means for rotating said molds, means for alternately inverting and reinverting pairs of blank and neck molds so that the blank mold opens upwardly at the charging station and downwardly at the blank transfer station, means for applying vacuum to the molds during the charging operation and for a predetermined period of time thereafter, finishing molds, means for transferring blanks from the blank and neck molds to the finishing molds for final shaping, said vacuum applying means comprising an arm mounted for oscillation about the axis of rotation of the blank molds in timed relation with movement of the latter, and means carried by the arm and providing separable connection between a source of vacuum supply and the molds.

2. In combination, an annular series of mold groups rotatable about a vertical axis and in succession past a mold charging station, means for imparting intermittent rotary movement to the molds whereby they are brought to a standstill at the charging station, each mold group comprising blank and neck molds, said blank mold arranged above the neck mold and opening upwardly at the charging station, a vacuum line, a valve therein, means for connecting the vacuum line to the mold groups in succession, a cam operable to hold said valve open while the vacuum line is connected to a mold group and thereby apply vacuum to the molds during the charging operation and a predetermined period of time thereafter during travel of the molds, means for causing said cam to travel with the mold groups in succession, finishing molds, and means for transferring blanks from the blank and neck molds to the finishing molds for final shaping.

3. In combination, an annular series of mold groups rotatable about a vertical axis and in succession past a mold charging station, means for imparting intermittent rotary movement to the molds whereby they are brought to a standstill at the charging station, each mold group comprising blank and neck molds, said blank mold arranged above the neck mold and opening upwardly at the charging station, a vacuum line, a valve therein, means for connecting the vacuum line to the mold groups in succession, a cam operable to hold said valve open while the vacuum line is connected to a mold group and thereby apply vacuum to the molds during the charging operation and a predetermined period of time thereafter, during travel of the molds, means for causing said cam to travel with the mold groups in succession, finishing molds, means for transferring blanks from the blank and neck molds to the finishing molds for final shaping, and means for adjusting the points of applying and shutting off vacuum.

4. In combination, an annular series of mold groups rotatable about a vertical axis and in succession past a mold charging station, means for imparting intermittent rotary movement to the molds whereby they are brought to a standstill at the charging station, each mold group comprising blank and neck molds, said blank mold arranged above the neck mold and opening upwardly at the charging station, means for applying vacuum to the molds during the charging operation and a predetermined period of time thereafter, including an arm arranged below the mold groups for oscillation about said vertical axis, a vacuum pipe at least in part carried by the arm, means operating automatically to establish communication between said pipe and the interior of the neck molds, means for oscillating the arm in timed relation with movements of the mold groups to maintain communication between the vacuum pipe and neck mold one at a time for predetermined time intervals, a valve actuated by movement of said arm for controlling the application of vacuum to said pipe, finishing molds, and means for transferring blanks from the blank and neck molds to the finishing molds for final shaping.

5. In combination, an annular series of mold groups rotatable about a vertical axis and in succession past a mold charging station, means for imparting intermittent rotary movement to the molds whereby they are brought to a standstill at the charging station, each mold group comprising blank and neck molds, said blank mold arranged above the neck mold and opening upwardly at the charging station, means for applying vacuum to the molds during the charging operation and a predetermined period of time thereafter, including an arm arranged below the mold groups for oscillation about said vertical axis, a vacuum pipe at least in part carried by the arm, means operating automatically to establish communication between said pipe and the interior of the neck molds, means for oscillating the arm in timed relation with movements of the mold groups to maintain communication between the vacuum pipe and neck mold one at a time for predetermined time intervals, a cam controlled valve for regulating the application of vacuum to said vacuum pipe and neck molds, a cam carried by said arm and operable to control opening and closing of the valve, finishing molds, and means for transferring blanks from the blank and neck molds to the finishing molds for final shaping.

6. In a glassware forming machine an annular series of mold groups each including blank and neck molds, means for rotating the series about a vertical axis to thereby bring the mold groups in succession to a charging station, said blank molds occupying a position above the neck mold and opening upwardly at said station to receive mold charges of molten glass, means operating during the charging operation and for a predetermined period of time thereafter to apply vacuum to the blank and neck molds, said vacuum applying means including an arm mounted for oscillation about the axis of rotation of the molds, a valve carried by the arm and adapted to engage the neck molds one at a time and in succession and thereby, in part, effect communication between the interior of the neck molds and a source of vacuum supply, and means for periodically applying vacuum to said valve.

7. In a glassware forming machine an annular series of mold groups each including blank and neck molds, means for rotating the series about a vertical axis to thereby bring the mold groups in succession to a charging station, said blank molds occupying a position above the neck mold and opening upwardly at said station to receive mold charges of molten glass, an arm mounted for oscillation about the axis of rotation of the molds, a cam carried by said arm, a vacuum control valve disposed below the arm and operable periodically by the cam, and means including an auxiliary valve carried by the arm for providing communication between said valve and the interior of the neck molds.

8. In a glassware forming machine an annular series of mold groups each including blank and neck molds, means for rotating the series about a vertical axis to thereby bring the mold groups in succession to a charging station, said blank molds occupying a position above the neck mold and opening upwardly at said station to receive mold charges of molten glass, an arm mounted for oscillation about the axis of rotation of the molds, a cam carried by said arm, a vacuum control valve disposed below the arm and operable periodically by the cam, and means including an auxiliary valve carried by the arm for providing communication between said valve and the interior of the neck molds, said cam adjustable to thereby regulate the length of the period of the application of vacuum to the molds and points of application and shutting off of vacuum.

9. In a glassware forming machine the combination of blank and finishing mold tables arranged side by side and adapted for rotation about spaced vertical axes, partible blank and neck molds on the blank mold table, partible finishing molds on the finishing mold table, means for rotating the mold tables to thereby bring the blank molds in succession to a charging station, said blank molds being disposed above the neck molds and opening upwardly at the charging station, plungers individual to the blank and neck molds, said plungers mounted for reciprocation axially of the molds and into and out of the neck molds, means regulating and controlling the length of the period of projection of the plunger into the neck molds comprising an oscillating arm, a cam carried by the arm and operatively connected to the plungers a predetermined length of time in each cycle of operations, means for oscillating the arm to maintain operative connection between the cam and the plungers for a predetermined period of time, and means for adjusting the effective length of the cam.

10. In a glassware forming machine the combination of blank and finishing mold tables arranged side by side and adapted for rotation about spaced vertical axes, partible blank and neck molds on the blank mold table, partible finishing molds on the finishing mold table, means for rotating the mold tables to thereby bring the blank molds in succession to a charging station, said blank molds being disposed above the neck molds and opening upwardly at the charging station, plungers individual to the blank and neck molds, said plungers mounted for reciprocation axially of the molds and into and out of the neck molds, plunger holders individual to the plungers and extending below the neck molds, a cam, means to oscillate the cam about the axis of the blank mold table and thereby cause it to engage the plunger holders in succession and cause projection of the plungers into the neck molds during a predetermined period of time in each cycle of operation, and means for adjusting the cam to adjustably vary the point at which the plungers are projected into the molds and the length of time they are held in said projected position.

11. In a glassware forming machine the combination of blank and finishing mold tables arranged side by side and adapted for rotation about spaced vertical axes, partible blank and neck molds on the blank mold table, partible finishing molds on the finishing mold table, means for rotating the mold tables to thereby bring the blank molds in succession to a charging station, said blank molds being disposed above the neck molds and opening upwardly at the charging station, plungers individual to the blank and neck molds, said plungers mounted for reciprocation axially of the molds and into and out of the neck molds, plunger holders individual to the plungers and extending below the neck molds, cam mechanism including a cam adapted to engage the plunger holders in succession and cause projection of the plungers into the neck molds during a predetermined period of time in each cycle of operation, means for causing said cam to travel with each plunger holder while in operative engagement therewith and then return and travel with the next succeeding plunger holder, means for applying vacuum to the neck and blank molds during substantially the entire period of projection of the plungers into said neck molds, and means for effecting relative adjustment of the periods of application of vacuum and projection of the plungers into the neck molds.

12. In a glassware forming machine, a blank mold table, a series of mold groups thereon, each group including partible blank and neck molds, means for intermittently rotating the table bringing the mold groups in succession to a charging station, said blank molds disposed above the neck mold and opening upwardly at said station, vacuum chambers individual to the neck molds, means for applying vacuum to the chambers one at a time during a predetermined period of each cycle of operation, said vacuum applying means comprising a stationary main control valve, an auxiliary valve, conduits connecting said valves, means for applying vacuum to the main control valve, means for alternately opening and closing the main control valve, and means whereby the auxiliary valve is brought into operative engagement with the vacuum chambers one at a time and opened by such engagement so that vacuum is applied to the chambers.

Signed at Toledo, Ohio, this 19th day of August 1930.

LEONARD D. SOUBIER.